(12) United States Patent
Wu-Lu et al.

(10) Patent No.: US 9,989,919 B2
(45) Date of Patent: Jun. 5, 2018

(54) METHOD FOR FORMING A HYDRAULIC TRANSFER FILM, HYDRAULIC TRANSFER FILM, AND PATTERNED ARTICLE

(71) Applicant: Daigin Chemical Co., Ltd., Taipei (TW)

(72) Inventors: Han-Cheng Wu-Lu, Taipei (TW); Chao-Chein Huang, Taoyuan County (TW); Mao-Feng Hsu, Taipei (TW)

(73) Assignee: Daigin Chemical Co., Ltd., Taipei (TW)

( * ) Notice: Subject to any disclaimer, the term of this patent is extended or adjusted under 35 U.S.C. 154(b) by 288 days.

(21) Appl. No.: 14/737,051

(22) Filed: Jun. 11, 2015

(65) Prior Publication Data

US 2015/0277376 A1 Oct. 1, 2015

Related U.S. Application Data

(63) Continuation-in-part of application No. 14/220,231, filed on Mar. 20, 2014, now Pat. No. 9,539,849.

(30) Foreign Application Priority Data

Jul. 30, 2013 (TW) .............. 102127263 A
Jun. 12, 2014 (TW) .............. 103120363 A

(51) Int. Cl.
*G03H 1/04* (2006.01)
*G03H 1/18* (2006.01)
*G03H 1/00* (2006.01)
*G03H 1/02* (2006.01)
*B44C 1/175* (2006.01)
(Continued)

(52) U.S. Cl.
CPC ......... *G03H 1/0402* (2013.01); *B44C 1/1758* (2013.01); *G03H 1/0005* (2013.01);
(Continued)

(58) Field of Classification Search
CPC .. B44C 1/1758; G03H 1/0005; G03H 1/0256; G03H 1/0402; G03H 1/18;
(Continued)

(56) References Cited

U.S. PATENT DOCUMENTS 4,337,289 A * 6/1982 Reed ................. B41M 3/12
156/234
6,040,040 A 3/2000 Rainbow
(Continued)

FOREIGN PATENT DOCUMENTS

CN 1572380 A 2/2005
CN 101678647 A 3/2010
(Continued)

*Primary Examiner* — Samir Shah
*Assistant Examiner* — Alicia J Sawdon
(74) *Attorney, Agent, or Firm* — Cesari and McKenna, LLP

(57) ABSTRACT

A method for forming a hydraulic transfer film includes: (a) forming a water-soluble sacrificial layer on a water-soluble substrate; (b) forming a first holographic pattern on the water-soluble sacrificial layer; (c) forming a pattern forming layer on the water-soluble sacrificial layer such that the pattern forming layer is formed with a second holographic pattern on a surface that contacts the first holographic pattern and being complementary to the first holographic pattern, the pattern forming layer having a water-soluble region and an oil-soluble region; (d) forming an oil-soluble base layer on the pattern forming layer; and (e) forming an activating layer that is on the oil-soluble base layer and that includes a curable activating agent.

8 Claims, 7 Drawing Sheets

(51) Int. Cl.
*B05D 5/06* (2006.01)
*B05D 1/20* (2006.01)

(52) U.S. Cl.
CPC ............ *G03H 1/0256* (2013.01); *G03H 1/18* (2013.01); *B05D 1/20* (2013.01); *B05D 5/06* (2013.01); *G03H 2001/0055* (2013.01); *G03H 2001/043* (2013.01); *G03H 2001/185* (2013.01)

(58) Field of Classification Search
CPC ..... G03H 2001/0055; G03H 2001/043; G03H 2001/185
See application file for complete search history.

(56) References Cited

U.S. PATENT DOCUMENTS

| | | | |
|---|---|---|---|
| 2006/0073342 A1 | 4/2006 | Ariga et al. | |
| 2007/0195387 A1* | 8/2007 | Weyermann | G03H 1/0236 359/3 |
| 2010/0104807 A1* | 4/2010 | Chiu | B44C 1/17 428/142 |
| 2010/0151207 A1* | 6/2010 | Hansen | B44C 1/16 428/172 |
| 2011/0209640 A1 | 2/2011 | Chiu | |
| 2012/0321862 A1* | 12/2012 | Ikeda | B44C 1/175 428/195.1 |
| 2015/0259540 A1* | 9/2015 | Sutou | B44C 1/175 156/243 |
| 2015/0277376 A1 | 10/2015 | Wu-Lu et al. | |
| 2016/0089873 A1 | 3/2016 | Wu-Lu et al. | |

FOREIGN PATENT DOCUMENTS

| | | | | |
|---|---|---|---|---|
| CN | 203004562 U | 6/2013 | | |
| JP | 2013240976 A | * 12/2013 | ............ | B44C 1/175 |
| TW | M347288 | 12/2008 | | |
| TW | 2009/27520 A | 7/2009 | | |
| WO | WO 2011102509 A1 | * 8/2011 | ............ | B44C 1/175 |

* cited by examiner

US 9,989,919 B2

METHOD FOR FORMING A HYDRAULIC TRANSFER FILM, HYDRAULIC TRANSFER FILM, AND PATTERNED ARTICLE

CROSS-REFERENCE TO RELATED APPLICATIONS

This application is a continuation-in-part (CIP) application of U.S. patent application Ser. No. 14/220,231, filed on Mar. 20, 2014 and claiming priority to Taiwanese Application No. 102127263, filed on Jul. 30, 2013, and claims priority to Taiwanese Application no. 103120363, filed on Jun. 12, 2014. The disclosures of these prior applications are incorporated herein by reference.

FIELD

The disclosure relates to a method for forming a hydraulic transfer film, a hydraulic transfer film, and a patterned article.

BACKGROUND

Conventionally, a holographic pattern is often formed on an entire surface of an article. It is difficult to form a part of the article with a pattern that includes both a holographic pattern and one of a normal pictorial pattern, a partial three-dimensional pattern, a leather pattern, a light/dark contrast pattern, etc.

Referring to FIGS. 1 to 8, Taiwanese Utility Model Patent No. M347288 discloses a method for forming a card 110 with laser texture, including the steps of: coating a first UV curable adhesive layer 114 on a plastic substrate 112; stamping the first UV curable adhesive layer 114 with a mold that is formed with a predetermined three dimensional laser pattern 115 to form a three dimensional laser pattern 115' on the first UV curable adhesive layer 114; curing the first UV curable adhesive layer 114 with an ultraviolet light source 117; filling indentations in the laser pattern 115' with a second UV curable adhesive layer 116; depositing a metal layer 118 to cover the first UV curable adhesive layer 114 and the second UV curable adhesive layer 116; and coating a transfer film 120 on the metal layer 118.

The laser pattern thus formed still occupies an entire surface of the plastic substrate 112. Furthermore, since the stamping step should be conducted on a rigid, flat substrate, e.g., the plastic substrate 112 made from PET or PVC, it is difficult to form a three-dimensional pattern on an article that has a non-planar surface with the conventional method.

SUMMARY

Therefore, an object of the disclosure is to provide a method for forming a hydraulic transfer film, a hydraulic transfer film, and a patterned article that may alleviate at least one of the aforesaid drawbacks of the prior art.

According to a first aspect of the present disclosure, a method for forming a hydraulic transfer film includes:
(a) forming a water-soluble sacrificial layer on a water-soluble substrate;
(b) forming a first holographic pattern on the water-soluble sacrificial layer;
(c) forming a pattern forming layer on the water-soluble sacrificial layer such that the pattern forming layer is formed with a second holographic pattern on a surface that contacts the first holographic pattern, the second holographic pattern being complementary to the first holographic pattern, the pattern forming layer being made of an ink material and having at least one water-soluble region and at least one oil-soluble region;
(d) forming an oil-soluble base layer on the pattern forming layer; and
(e) forming an activating layer on the oil-soluble base layer, the activating layer including a curable activating agent.

According to a second aspect of the present disclosure, a hydraulic transfer film includes:
a water-soluble substrate;
a water-soluble sacrificial layer that is formed on said water-soluble substrate;
a pattern forming layer that is formed on said water-soluble sacrificial layer and that has at least one water-soluble region and at least one oil-soluble region, said water-soluble sacrificial layer and said pattern forming layer being respectively formed with first and second holographic patterns that are complementary to each other;
an oil-soluble base layer that is formed on said pattern forming layer; and
an activating layer that is formed on said oil-soluble base layer and that includes a curable activating agent.

According to a third aspect of the present disclosure, a method for forming a patterned article includes:
providing a hydraulic transfer film prepared by the method of the first aspect;
contacting an article with the activating layer of the hydraulic transfer film, and pressing the water-soluble substrate of the hydraulic transfer film into water so that the hydraulic transfer film covers the article;
retrieving the article and the hydraulic transfer film from the water; curing the curable activating agent in the activating layer; and
washing off the water-soluble substrate, the water-soluble sacrificial layer, and the water-soluble region of the pattern forming layer to obtain the patterned article.

According to a fourth aspect of the present disclosure, a patterned article includes:
an article; and
a pattern film including
an activating layer that includes a cured activating agent and that is formed on said article,
an oil-soluble base layer that is formed on said activating layer, and
a pattern layer that is formed on said oil-soluble base layer, that partially covers said oil-soluble base layer, and that is made of an oil-soluble ink material, said pattern layer protruding from said oil-soluble base layer to define a three-dimensional pattern on said oil-soluble base layer, said pattern layer being formed with a holographic pattern.

According to a fifth aspect of the present disclosure, a method for forming a hydraulic transfer film includes:
(a) forming a water-soluble sacrificial layer on a water-soluble substrate;
(b) forming a pattern forming layer on the water-soluble sacrificial layer, the pattern forming layer being made of an ink material and having at least one water-soluble region and at least one oil-soluble region;
(d) forming an oil-soluble base layer on the pattern forming layer;
(e) forming a holographic pattern on the oil-soluble base layer; and (f) forming an activating layer on the oil-soluble base layer, the activating layer including a curable activating agent.

According to a sixth aspect of the present disclosure, a hydraulic transfer film includes:
a water-soluble substrate;
a water-soluble sacrificial layer that is formed on said water-soluble substrate;
a pattern forming layer that is formed on said water-soluble sacrificial layer and that has at least one water-soluble region and at least one oil-soluble region;
an oil-soluble base layer that is formed on said pattern forming layer and that has a surface oppositely of said pattern forming layer, said surface of said oil-soluble base layer being formed with a holographic pattern; and
an activating layer that is formed on said oil-soluble base layer and that includes a curable activating agent.

According to a seventh aspect of the present disclosure, a method for forming a patterned article includes:
providing a hydraulic transfer film prepared by the method of the fifth aspect;
contacting an article with the activating layer of the hydraulic transfer film, and pressing the water-soluble substrate of the hydraulic transfer film into water so that the hydraulic transfer film covers the article;
retrieving the article and the hydraulic transfer film from the water;
curing the curable activating agent in the activating layer; and
washing off the water-soluble substrate, the water-soluble sacrificial layer, and the water-soluble region of the pattern forming layer to obtain the patterned article.

According to an eighth aspect of the present disclosure, a patterned article includes:
an article; and
a pattern film including
an activating layer that includes a cured activating agent and that is formed on said article,
an oil-soluble base layer that is formed on said activating layer and that has a surface contacting said activating layer and formed with a holographic pattern, and
a pattern layer that is formed on said oil-soluble base layer, that partially covers said oil-soluble base layer, and that is made of an oil-soluble ink material, said pattern layer protruding from said oil-soluble base layer to define a three-dimensional pattern on said oil-soluble base layer.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
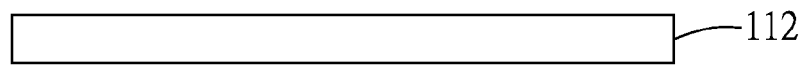
FIGS. 1 to 8 are consecutive steps of forming a conventional card with laser texture.
Figure 2:
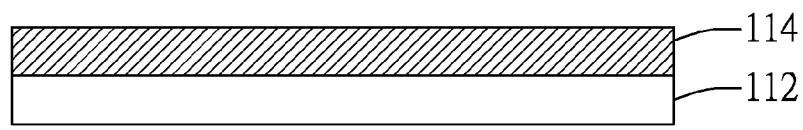
Figure 3:
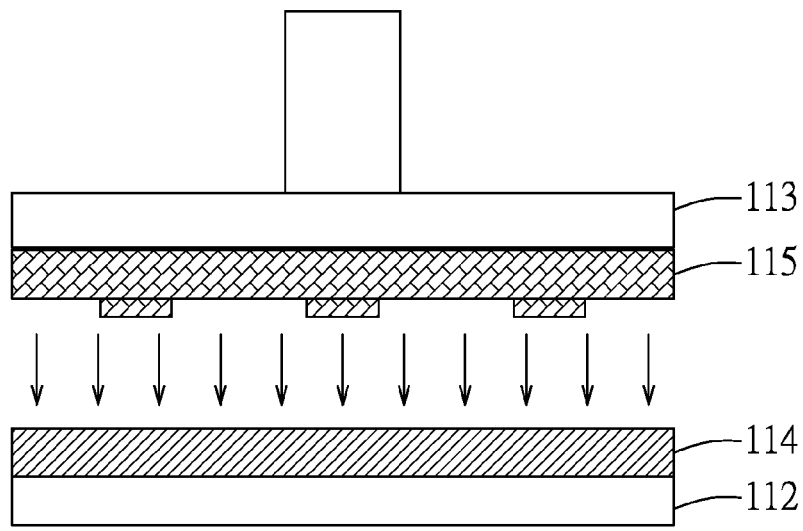
Figure 4:
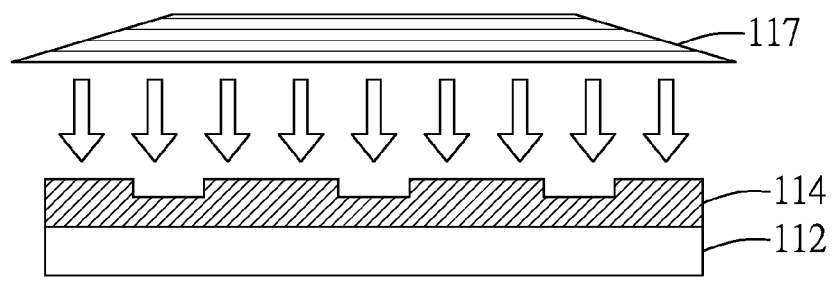
Figure 5:
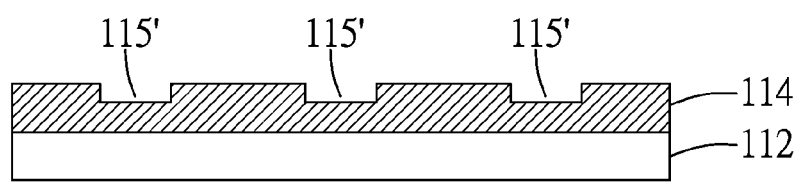
Figure 6:
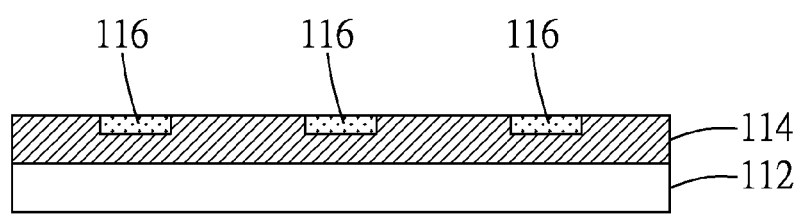
Figure 7:
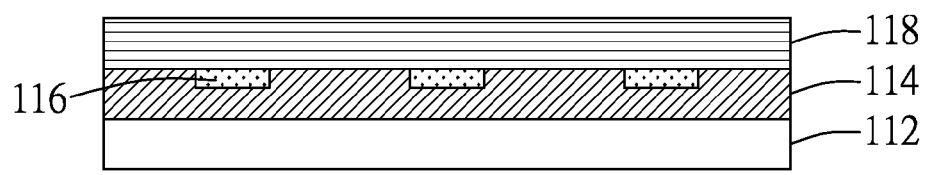
Figure 8:
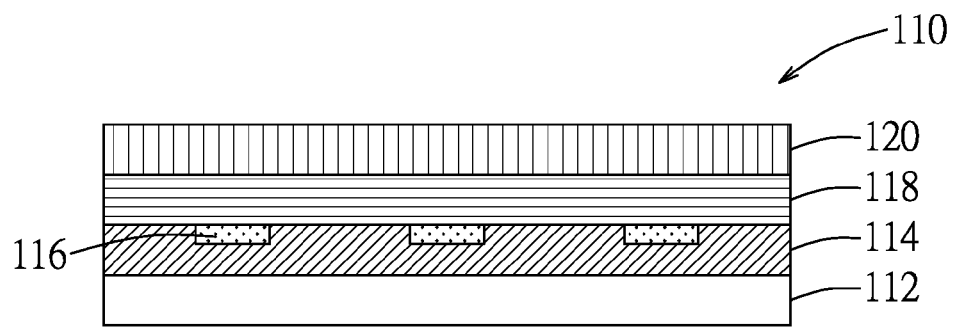

Before the disclosure is described in greater detail with reference to the accompanying embodiments, it should be noted herein that like elements are denoted by the same reference numerals throughout the disclosure.

Figure 9:
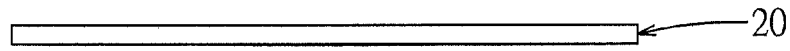
FIGS. 9 to 16 are consecutive steps of forming a patterned article of the first embodiment according to the present disclosure.
Figure 10:
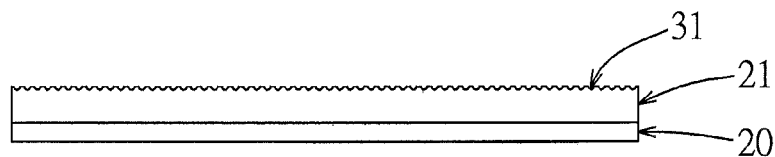
Figure 11:
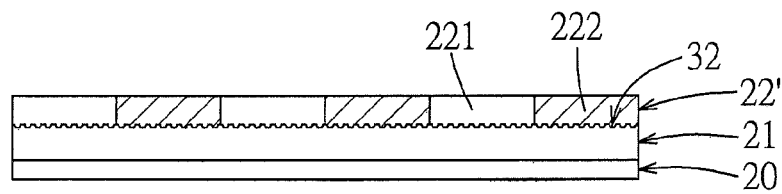
Figure 12:
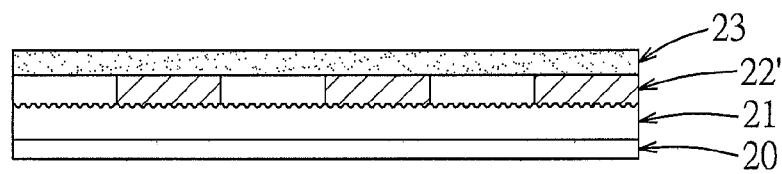
Figure 13:
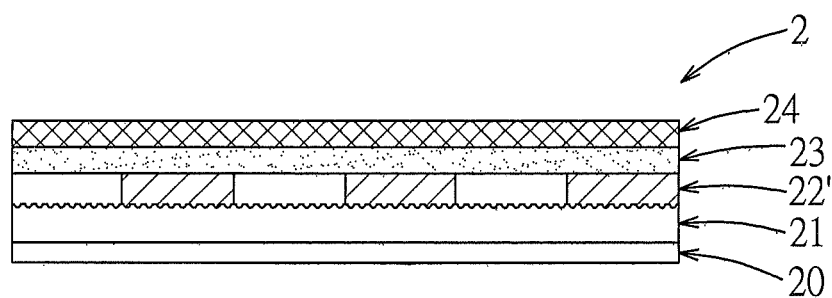

Referring to FIGS. 9 to 13, in the first embodiment, a method of forming a hydraulic transfer film 2 includes the following steps:

(a) forming a water-soluble sacrificial layer 21 on a water-soluble substrate 20 (see FIGS. 9 and 10);

(b) forming a first holographic pattern 31 on the water-soluble sacrificial layer 21 before the water-soluble sacrificial layer 21 is dried (see FIG. 10);

(c) forming a pattern forming layer 22' on the water-soluble sacrificial layer 21 such that the pattern forming layer 22' is formed with a second holographic pattern 32 on a surface that contacts the metal layer and the first holographic pattern 31 (see FIG. 11), the second holographic pattern 32 being complementary to the first holographic pattern 31, the pattern forming layer 22' being made of an ink material and having at least one oil-soluble region 222 on which at least part of the second holographic pattern 32 is formed, and at least one water-soluble region 221;

(d) forming an oil-soluble base layer 23 on the pattern forming layer 22' (see FIG. 12); and (e) forming an activating layer 24 on the oil-soluble base layer 23 (see FIG. 13), the activating layer 24 including a curable activating agent that partially permeates into the oil-soluble base layer 23, the pattern forming layer 22' and the water-soluble sacrificial layer 21, and is admixed with a material of each of the oil-soluble base layer 23, the pattern forming layer 22' and the water-soluble sacrificial layer 21.

The water-soluble sacrificial layer 21, the oil-soluble base layer 23 and activating layer 24 are independently formed by techniques including printing, spraying, roller coating, etc. To be more specific, the water-soluble sacrificial layer 21 may be formed by reverse coating (e.g., micro-gravure coating). The pattern forming layer 22' may be formed by gravure printing or screen printing. The oil-soluble base layer 23 may be formed by gravure printing. The activating layer 24 may be formed by roller coating. In step (b), the first holographic pattern 31 may be formed by stamping (using a mold) or rolling. When the first holographic pattern 31 is formed by stamping, ultraviolet radiation may be applied to cure the water-soluble sacrificial layer 21 before the mold is removed from the first holographic pattern 31.

The water-soluble substrate 20 may be a polyvinyl alcohol (PVA) film. The water-soluble sacrificial layer 21 may be made of a material selected from, but not limited to, a water-soluble ink material (commercially available as WS-T01, from Daigin Chemical Co., LTD.) and a UV-curable water-soluble ink material (commercially available as WS-U01, from Daigin Chemical Co., LTD.). In the first embodiment, the water-soluble sacrificial layer 21 is made of WS-T01.

The water-soluble region 221 of the pattern forming layer 22' may be made of a water-soluble ink material. Commercial examples of the water-soluble ink material include, but are not limited to, WHC-A01, WHPI-C01 and WHPI-F01 manufactured by Daigin Chemical Co., LTD. The water-soluble ink material may include a plurality of micro powders. In the first embodiment, the water-soluble ink material is WHC-A01.

The oil-soluble region 222 of the pattern forming layer 22' and the oil-soluble base layer 23 may be made of an oil-soluble ink material. Commercial examples of the oil-soluble ink material include, but are not limited to, SHC-UA01, SPI-UC01, SPI-UF01 and SPI-L-US01 manufactured by Daigin Chemical Co., LTD. The oil-soluble ink material may include micro powders, e.g., fuzz powders, wax powders, flat powders, and combinations thereof. In the first embodiment, the oil-soluble ink material used in the oil-soluble region 222 is SPI-L-US01, and the oil-soluble ink material used in the oil-soluble base layer 23 is SPI-UC01.

The curable activating agent of the activating layer 24 is curable by heat or by radiation (e.g., ultraviolet light). Commercial examples of the curable activating agent include, but are not limited to, UVAU-A01, UVAU-F01 and UVAU-C01 manufactured by Daigin Chemical Co., LTD. The amount of the curable activating agent 24 used in step (e) may range from 5 g/m$^2$ to 50 g/m$^2$. In the first embodiment, the curable activating agent is UVAU-A01, and the amount thereof is 25 g/m$^2$.

The method may further include step (f) of forming a metal layer (not shown) on the first holographic pattern 31 before step (c). The metal layer is also formed with the second holographic pattern 32. The metal layer may have a thickness ranging from 100 Å to 200 Å, and may be made of aluminum and deposited by physical vapor deposition (PVD) (e.g., vacuum evaporation).

The method may further include a step of forming a decorative layer (not shown) on the oil-soluble region 222 before step (d).

Referring again to FIG. 13, the hydraulic transfer film 2 formed by the above-disclosed method according to the present disclosure includes the water-soluble substrate 20, the water-soluble sacrificial layer 21 formed on the water-soluble substrate 20, the pattern forming layer 22' formed on the water-soluble sacrificial layer 21, the oil-soluble base layer 23 formed on the pattern forming layer 22', and the activating layer 24 formed on the oil-soluble base layer 23. The pattern forming layer 22' has at least one of the water-soluble region 221 and at least one of the oil-soluble region 222. The water-soluble sacrificial layer 21 and the pattern forming layer 22' are respectively formed with the first and second holographic patterns 31, 32 that are complementary to each other. A surface of the water-soluble sacrificial layer 21 that is formed with the first holographic pattern 31 contacts the surface of the pattern forming layer 22' that is formed with the second holographic pattern 32. The activating layer 24 includes the curable activating agent. The oil-soluble base layer 23, the pattern forming layer 22' and the water-soluble sacrificial layer 21 contain the curable activating agent that permeates from the activating layer 24. The hydraulic transfer film 2 further includes the metal layer (not shown) formed on the first holographic pattern 31, and an ink decorative layer (not shown) disposed between the oil-soluble region 222 of the pattern forming layer 22' and the oil-soluble base layer 23.

Figure 14:
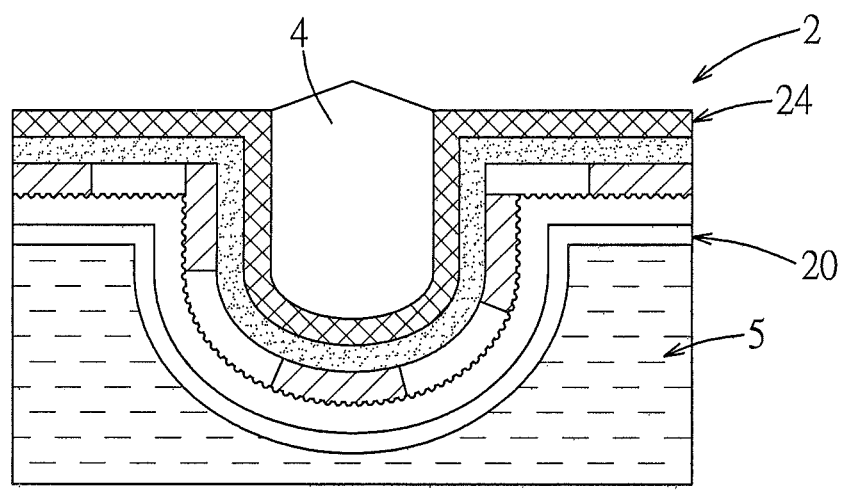
Figure 15:
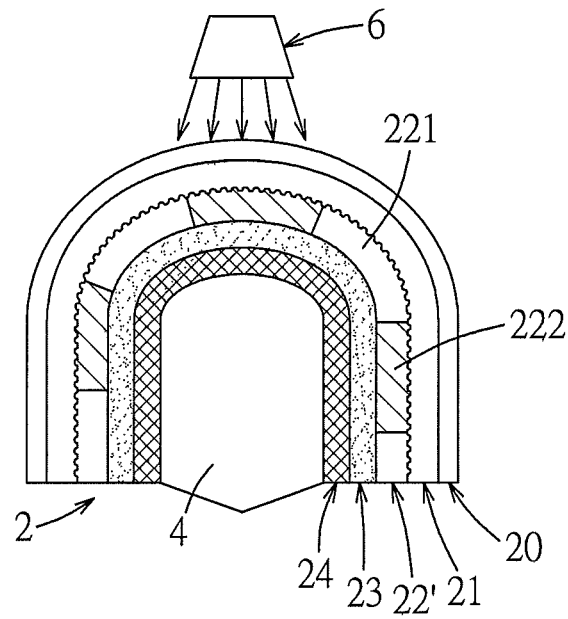
Figure 16:
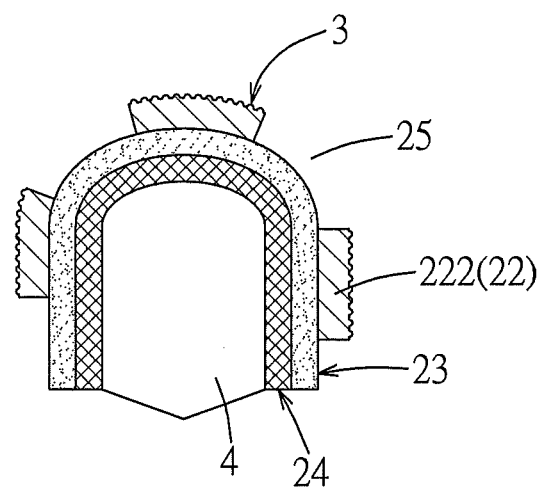

FIGS. 14 to 16 show a transfer process to transfer a portion of the hydraulic transfer film 2 onto an article 4 so as to obtain a patterned article (see FIG. 16) of the first embodiment. The patterned article includes the article 4 and a pattern film formed from the hydraulic transfer film 2. To be specific, the patterned article is formed by contacting the article 4 with the activating layer 24 of the hydraulic transfer film 2 and pressing the water-soluble substrate 20 of the hydraulic transfer film 2 into water so as to cover the article 4 with the hydraulic transfer film 2 (FIG. 14).

Then, as shown in FIG. 15, the article 4 and the hydraulic transfer film 2 are retrieved from the water 5. The curable activating agent in the water-soluble sacrificial layer 21, the pattern forming layer 22', the oil-soluble base layer 23 and the activating layer 24 are cured by an ultraviolet light emitted by an ultraviolet light source 6.

Next, as shown in FIG. 16, the water-soluble substrate 20, the water-soluble sacrificial layer 21, the water-soluble region 221 of the pattern forming layer 22', and part of the metal layer disposed on the water-soluble region 221 are washed off with water to obtain the patterned article.

In the patterned article, the activating layer 24 is formed on the article 4, the oil-soluble base layer 23 is formed on the activating layer 24, and a pattern layer 22, which is composed of the oil-soluble region 222 and has a desired holographic pattern 3 formed from a part of the second holographic pattern 32, is formed on the oil-soluble base layer 23 and partially covers the oil-soluble base layer 23. The pattern layer 22 protrudes from the oil-soluble base layer 23 to define a three-dimensional pattern. Thus, the patterned article obtained has the holographic pattern 3 and the three-dimensional pattern.

In the first embodiment, the pattern forming layer 22' has a plurality of the spaced-apart oil-soluble regions 222, and thus the pattern layer 22 is composed of the spaced-apart oil-soluble regions 222. A plurality of recesses 25 are formed among the spaced-apart oil-soluble regions 222. The pattern layer 22 and the oil-soluble base layer 23 contain the cured activating agent that permeates from the activating layer 24 before curing. The metal layer formed on the pattern layer 22 may have a pattern identical to the desired holographic pattern 3 on the pattern layer 22.

Note that the article 4 may be a non-planar plastic product, a non-planar metal product or a non-planar glass product. The non-planar plastic product may be made of acrylonitrile butadiene styrene (ABS) or polycarbonates (PC). The non-planar metal product may be made of magnalium. In the first embodiment, the article 4 is a glass bottle.

A method of forming a hydraulic transfer film 2 of the second embodiment is similar to the method described in the first embodiment and will now be described.

The method of the second embodiment includes the steps of:
  (a) forming the water-soluble sacrificial layer 21 on the water-soluble substrate 20;
  (b) forming the pattern forming layer 22' on the water-soluble sacrificial layer 21, the pattern forming layer 22' being made of an ink material and having at least one water-soluble region 221 and at least one oil-soluble region 222;
  (d) forming the oil-soluble base layer 23 on the pattern forming layer 22';
  (e) forming a holographic pattern 3' on the oil-soluble base layer 23; and
  (f) forming the activating layer 24 on the oil-soluble base layer 23, the activating layer 24 including the curable activating agent.

The materials used for the hydraulic transfer film 2 may be the same as those of the first embodiment.

The hydraulic transfer film 2 of the second embodiment includes:
  the water-soluble substrate 20;
  the water-soluble sacrificial layer 21 that is formed on the water-soluble substrate 20;
  the pattern forming layer 22' that is formed on the water-soluble sacrificial layer 21 and that has at least one water-soluble region 221 and at least one oil-soluble region 222;
  the oil-soluble base layer 23 that is formed on the pattern forming layer 22' and that has a surface oppositely of the pattern forming layer 22', the surface of the oil-soluble base layer 23 being formed with the holographic pattern 3; and the activating layer 24 that is formed on the oil-soluble base layer 23 and that includes the curable activating agent.

The differences of the hydraulic transfer film 2 between the first and second embodiments reside in the position of the holographic patterns 3, 3'. In the first embodiment, the holographic pattern 3 is formed on the oil-soluble region 222; in the second embodiment, the holographic pattern 3' is formed on the oil-soluble base layer 23, and is sandwiched between the oil-soluble base layer 23 and the activating layer 24.

A part of the hydraulic transfer film 2 can be transferred onto an article 4 using the same transfer process as that described in the first embodiment so as to obtain a patterned article.

Figure 17:
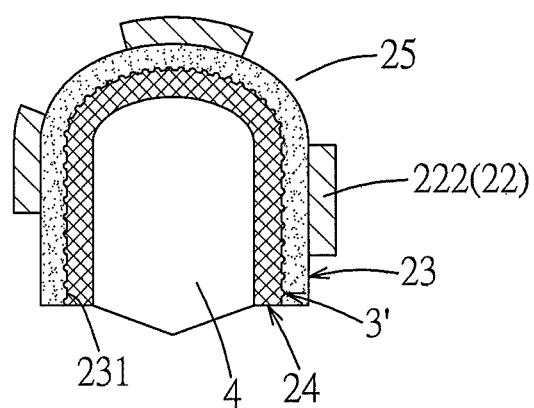
FIG. 17 illustrates a patterned article of the second embodiment according to the present disclosure.

FIG. 17 shows the patterned article of the second embodiment which includes the article 4 and the pattern film. In the second embodiment, the pattern film includes the activating layer 24 formed on the article 4, the oil-soluble base layer 23 formed on the activating layer 24, and the pattern layer 22 formed on the oil-soluble base layer 23. The oil-soluble base layer 23 has a surface 231 contacting the activating layer 24 and formed with the holographic pattern 3'. The pattern layer 22 partially covers the oil-soluble base layer 23 (i.e., partially exposes the holographic pattern 3'), and is made of an oil-soluble ink material. The pattern layer 22 is composed of a plurality of the spaced-apart oil-soluble regions 222 and protrudes from the oil-soluble base layer 23 to define the three-dimensional pattern on the oil-soluble base layer 23. Thus, the patterned article obtained has the holographic pattern 3' and the three-dimensional pattern.

To sum up, with the designs of the hydraulic transfer films 2 of the first and second embodiments, a holographic pattern and a three-dimensional pattern may be simultaneously formed on a non-planar article.

While the disclosure has been described in connection with what are considered the exemplary embodiments and variation, it is understood that this disclosure is not limited to the disclosed embodiments but is intended to cover various arrangements included within the spirit and scope of the broadest interpretation so as to encompass all such modifications and equivalent arrangements.

The invention claimed is:

1. A hydraulic transfer film comprising:
   a water-soluble substrate;
   a water-soluble sacrificial layer that is formed on said water-soluble substrate;
   a pattern forming layer that is formed on said water-soluble sacrificial layer and that has at least one water-soluble region and at least one oil-soluble region, said water-soluble sacrificial layer and said pattern forming layer being respectively formed with a first holographic pattern and a second holographic pattern that are complementary to each other;
   an oil-soluble base layer that is formed on said pattern forming layer; and
   an activating layer that is formed on said oil-soluble base layer and that includes a curable activating agent.

2. The hydraulic transfer film as claimed in claim 1, wherein a surface of said water-soluble sacrificial layer that is formed with said first holographic pattern contacts a surface of said pattern forming layer that is formed with said second holographic pattern.

3. The hydraulic transfer film as claimed in claim 1, wherein said oil-soluble base layer, said pattern forming layer, and said water-soluble sacrificial layer contain said curable activating agent that permeates from said activating layer.

4. A method of forming the hydraulic transfer film of claim 1, comprising:
   a) forming a water-soluble sacrificial layer on a water-soluble substrate;
   (b) forming a first holographic pattern on the water-soluble sacrificial layer;
   (c) forming a pattern forming layer on the water-soluble sacrificial layer such that the pattern forming layer is formed with a second holographic pattern on a surface that contacts the first holographic pattern, the second holographic pattern being complementary to the first holographic pattern, the pattern forming layer being made of an ink material and having at least one water-soluble region and at least one oil-soluble region;
   (d) forming an oil-soluble base layer on the pattern forming layer; and
   (e) forming an activating layer on the oil-soluble base layer, the activating layer including a curable activating agent.

5. The method as claimed in claim 4, wherein at least part of the second holographic pattern is formed on the oil-soluble region.

6. The method as claimed in claim 4, wherein in step (e), the curable activating agent in the activating layer partially permeates into the oil-soluble base layer, the pattern forming layer, and the water-soluble sacrificial layer.

7. The method as claimed in claim 4, wherein the curable activating agent is curable by ultraviolet light.

8. A method of forming a patterned article, comprising:
   providing a hydraulic transfer film prepared by the method of claim 4;
   contacting an article with the activating layer of the hydraulic transfer film, and pressing the water-soluble substrate of the hydraulic transfer film into water so that the hydraulic transfer film covers the article;
   retrieving the article and the hydraulic transfer film from the water;
   curing the curable activating agent in the activating layer; and
   washing off the water-soluble substrate, the water-soluble sacrificial layer, and the water-soluble region of the pattern forming layer to obtain the patterned article.

* * * * *